United States Patent
Kozaki

(10) Patent No.: US 11,035,488 B2
(45) Date of Patent: Jun. 15, 2021

(54) VACUUM VALVE AND VALVE CONTROL DEVICE

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/664,829

(22) Filed: Oct. 26, 2019

(65) Prior Publication Data

US 2020/0200289 A1   Jun. 25, 2020

(30) Foreign Application Priority Data

Dec. 20, 2018 (JP) .............................. JP2018-238517

(51) Int. Cl.

| F16K 31/06 | (2006.01) |
|---|---|
| F16K 31/04 | (2006.01) |
| F16K 31/02 | (2006.01) |
| G05D 16/20 | (2006.01) |
| F16K 41/10 | (2006.01) |
| F16K 37/00 | (2006.01) |

(52) U.S. Cl.
CPC .............. *F16K 31/02* (2013.01); *F16K 31/04* (2013.01); *F16K 31/0655* (2013.01); *F16K 31/0675* (2013.01); *F16K 37/005* (2013.01); *F16K 41/10* (2013.01); *G05D 16/202* (2013.01); *Y10T 137/7761* (2015.04)

(58) Field of Classification Search
CPC ............ Y10T 137/7761; G05D 16/024; G05D 16/202; F16K 1/00; F16K 15/02; F16K 31/02; F16K 31/04; F16K 31/0655; F16K 31/0675; F16K 31/0679; F16K 31/508; F16K 37/0041; F16K 37/005; F16K 41/10; F16K 51/02

USPC .............................................. 251/65, 129.11
See application file for complete search history.

(56) References Cited

U.S. PATENT DOCUMENTS

| 5,560,586 A * | 10/1996 | Aruga ...................... F16K 31/04 |
| | | 251/129.11 |
| 5,820,104 A * | 10/1998 | Koyano .................. F16K 51/02 |
| | | 251/326 |
| 6,464,825 B1 * | 10/2002 | Shinozaki ........... C23C 16/4584 |
| | | 118/724 |
| 6,994,311 B2 * | 2/2006 | Duelli .................... F16K 27/102 |
| | | 137/219 |
| 7,066,443 B2 * | 6/2006 | Ishigaki .................. F16K 51/02 |
| | | 251/195 |
| 7,117,886 B2 * | 10/2006 | Kajitani ............... G05D 16/202 |
| | | 137/487.5 |

(Continued)

FOREIGN PATENT DOCUMENTS

| JP | 2001-304173 A | 10/2001 |
| JP | 2017-227325 A | 12/2017 |

*Primary Examiner* — Matthew W Jellett
(74) *Attorney, Agent, or Firm* — Renner, Otto, Boisselle & Sklar, LLP

(57) ABSTRACT

A vacuum valve for driving a valve body arranged facing a valve opening up and down relative to the valve opening to perform valve opening/closing operation, comprises: a first up-down driver configured to drive the valve body up and down with a first minimum drivable amount; and a second up-down driver configured to drive the valve body up and down with a second minimum drivable amount smaller than the first minimum drivable amount.

11 Claims, 12 Drawing Sheets

(56) References Cited

U.S. PATENT DOCUMENTS

| | | | |
|---|---|---|---|
| 9,329,603 B2* | 5/2016 | Watanabe | G05D 16/2097 |
| 2008/0191155 A1* | 8/2008 | Scollay | F16K 51/02 |
| | | | 251/65 |

* cited by examiner

VACUUM VALVE AND VALVE CONTROL DEVICE

BACKGROUND OF THE INVENTION

1. Technical Field

The present invention relates to a vacuum valve and a valve control device.

2. Background Art

Typically, a poppet vacuum valve configured to control a flow rate has been known (see, e.g., Patent Literature 1 (JP-A-2017-227325)). In the vacuum valve described in Patent Literature 1, a valve body is driven up and down relative to a valve seat to control a valve body opening degree. For example, a feed screw drive method as in a technique described in Patent Literature 2 (JP-A-2001-304173) has been generally known as a valve body drive method. In the technique described in Patent Literature 2, a threaded rod screwed into a ball screw nut fixed to a valve rod is rotatably driven by, e.g., a stepping motor to drive a valve body fixed to the valve rod up and down.

In a vacuum process of a semiconductor manufacturing device, an automatic pressure adjustment vacuum valve configured to automatically adjust the pressure of a vacuum chamber in lean gas atmosphere to a preset target pressure is used. The above-described vacuum valve described in Patent Literature 1 is also used as the automatic pressure adjustment vacuum valve.

SUMMARY OF THE INVENTION

For the automatic pressure adjustment vacuum valve, a valve body opening degree needs to be finely adjusted in the vicinity of the target pressure. For this reason, fine adjustment performance is required for valve body drive. However, in the vacuum valve configured to control opening/closing of the valve body by the feed screw drive method, there is a problem that valve body opening degree fine adjustment performance is insufficient due to backlash of a feed screw mechanism.

A vacuum valve for driving a valve body arranged facing a valve opening up and down relative to the valve opening to perform valve opening/closing operation, comprises: a first up-down driver configured to drive the valve body up and down with a first minimum drivable amount; and a second up-down driver configured to drive the valve body up and down with a second minimum drivable amount smaller than the first minimum drivable amount.

The first up-down driver drives, integrally with the valve body, the second up-down driver in a valve body up-down direction.

The second up-down driver is a magnetic levitation actuator configured to magnetically levitate and support the valve body in an up-down drive direction.

The first up-down driver is a linear actuator using a ball screw to be driven by a stepping motor.

The linear actuator includes; a ball screw nut provided at a slider fixed to the second up-down driver, a coupling, a threaded rod screwed into the ball screw nut, threaded rod being joined to a rotor shaft of the stepping motor by the coupling, and the slider supported by a support to slide in the z-axis direction.

The magnetic levitation actuator includes; an upper electromagnet, a lower electromagnet and an axial disc magnetically levitated and supported in a z-axis direction by the upper electromagnet and the lower electromagnet.

The magnetic levitation actuator further includes; a sensor target provided on the lower surface of the axial disc and, an axial gap sensor provided facing the sensor target, and detecting displacement of the axial disc in the z-axis direction.

The vacuum valve further comprises; a linear ball bearing provided at a body case and, a valve rod fastened to the axial disc, and supported by the linear ball bearing to move in the z-axis direction. The valve rod extends to a vacuum chamber side through a valve seat, and the valve body arranged in the vacuum chamber is fixed to an upper end of the valve rod.

A bellows is provided between the valve rod and the valve seat such that no gas enters the vacuum chamber through a clearance between a through-hole of the valve seat and the valve rod.

The first up-down driver is a linear actuator using a ball screw to be driven by a stepping motor, a position accuracy of the linear actuator is $\Delta La1 + \Delta La2$, $\Delta La1$ being a minimum displacement of a valve rod according to a step angle of the stepping motor, $\Delta La2$ being a maximum value of a displacement error due to backlash of the stepping motor, and the magnetic levitation actuator is configured so that displacement of a valve rod can be adjusted by $\Delta La1 + \Delta La2$.

The second up-down driver has a position accuracy for positioning the valve body with a smaller movement amount than a movement amount indicating a position accuracy of the first up-down driver.

A valve control device for controlling the vacuum valve comprises: a first controller configured to control up-down drive by the first up-down driver by open loop control based on a pressure target value and a pressure measurement value of a chamber subjected to vacuum-pumping through the vacuum valve; and a second controller configured to control up-down drive of the second up-down driver by closed loop control or up-down drive of the first and second up-down drivers by closed loop control, based on the pressure target value and the pressure measurement value of the chamber subjected to vacuum-pumping through the vacuum valve.

The second controller controls the up-down drive by the second up-down driver based on the pressure target value and the pressure measurement value after the up-down drive by the first up-down driver.

A valve control device for controlling the vacuum valve comprises: a first controller configured to control up-down drive by the first up-down driver by open loop control based on a pressure target value and a pressure measurement value of a chamber subjected to vacuum-pumping through the vacuum valve; and a second controller configured to control up-down drive by the second up-down driver by closed loop control based on the pressure target value and the pressure measurement value of the chamber subjected to vacuum-pumping through the vacuum valve. The second controller drives, when the vacuum valve is fully closed, the valve body in a direction of a valve seat by the magnetic levitation actuator, and with predetermined force, presses the valve body against a seal member provided between the valve body and the valve seat.

According to the present invention, fine adjustment performance of a vacuum valve configured to drive a valve body up and down can be improved.

DETAILED DESCRIPTION OF THE EXEMPLARY EMBODIMENTS

Figure 1:
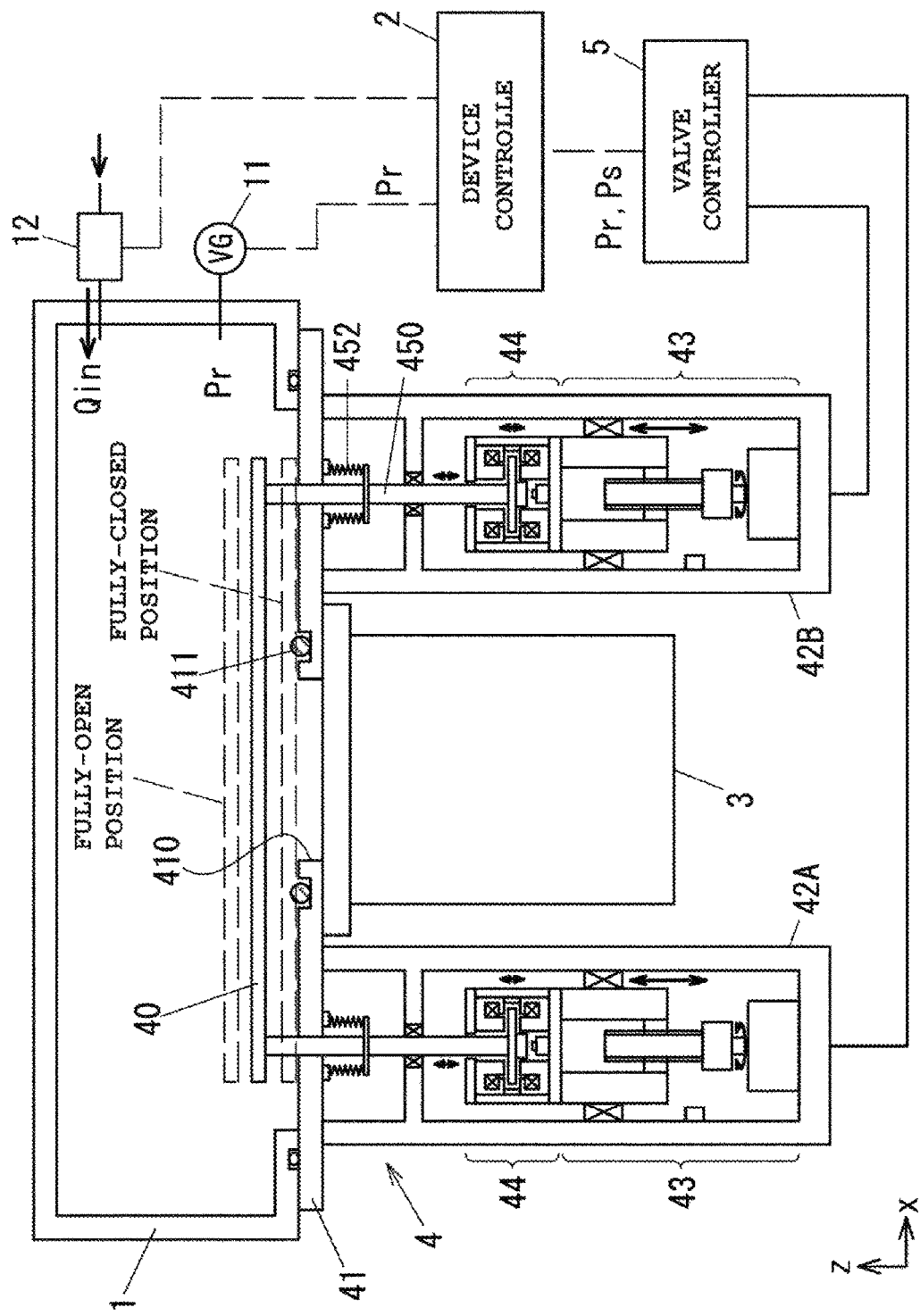
FIG. 1 is a view of an outline configuration of a vacuum device attached to a vacuum valve.

Hereinafter, an embodiment of the present invention will be described with reference to the drawings. FIG. 1 is a view of one embodiment of a vacuum valve according to the present invention, and is a view of an outline configuration of a vacuum device attached to a vacuum valve 4. The vacuum device includes a vacuum chamber 1 in which a vacuum process is performed, and a device controller 2 configured to perform control regarding processing in the vacuum chamber 1.

A vacuum pump 3 configured to vacuum-pump gas from the vacuum chamber 1 and the vacuum valve 4 configured to adjust an effective pumping speed upon vacuum pumping of the vacuum chamber 1 are attached to the vacuum chamber 1. For example, a turbo-molecular pump is used as the vacuum pump 3. The operation of opening/closing the vacuum valve 4 is controlled by a valve controller 5. The internal pressure (hereinafter referred to as a "pressure measurement value") Pr of the vacuum chamber 1 is measured by a vacuum meter 11. The flow rate Qin of gas injected into the vacuum chamber 1 is measured by a flowmeter 12. Measurement values of the vacuum meter 11 and the flowmeter 12 are input to the device controller 2.

The vacuum valve 4 includes a valve body 40, a valve seat 41, and two valve body drivers 42A, 42B. A valve opening 410 is formed at the valve seat 41 fixed to the vacuum chamber 1, and a suction port flange of the vacuum pump 3 is fixed to the valve opening 410. As indicated by dashed lines, the valve body 40 is driven to move up and down in an upper-to-lower direction (a z-axis direction) as viewed in the figure relative to the valve opening 410. A seal member 411 is provided on a vacuum chamber side surface of the valve seat 41. When the vacuum valve 4 is in a fully-closed state, the valve body 40 is pressed by the seal member 411, and therefore, the valve opening 410 is fully closed by the valve body 40. Two valve body drivers 42A, 42B have the same configuration, and each of the valve body drivers 42A, 42B includes a coarse adjustment driver 43 and a fine adjustment driver 44.

Note that the planar shapes of the valve opening 410 and the valve body 40 are preferably a circular shape, but may be a rectangular shape. Moreover, two valve body drivers 42A, 42B are preferably placed at positions symmetry about the center axis of the valve body 40.

(Valve Body Drivers 42A, 42B)

Figure 2:
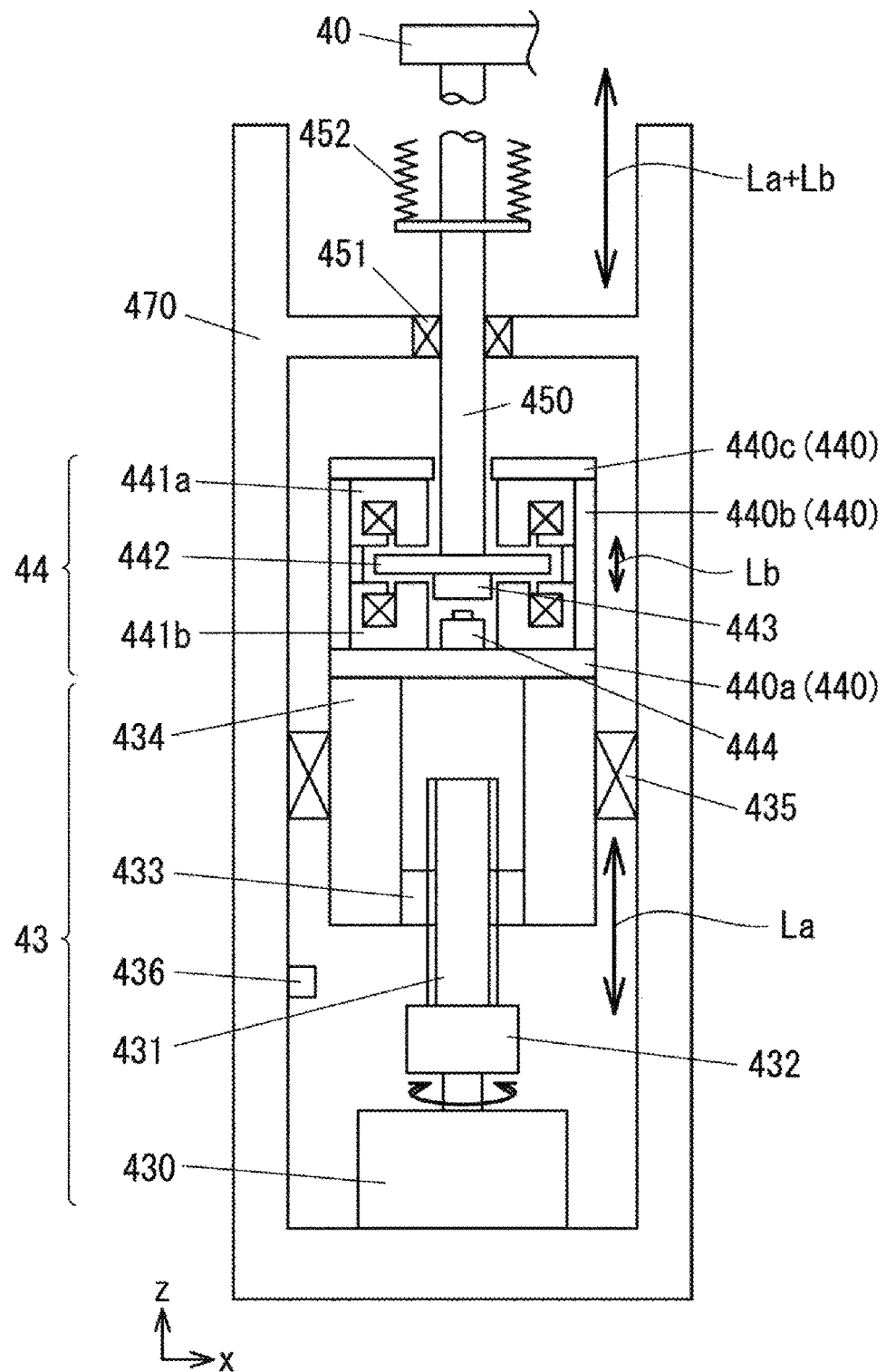
FIG. 2 is an enlarged view of a valve body driver.

FIG. 2 is an enlarged view of the valve body driver 42A. The coarse adjustment driver 43 is a linear actuator to be driven by a stepping motor 430, and in the present embodiment, a linear actuator using a ball screw is employed. A threaded rod 431 screwed into a ball screw nut 433 is joined to a rotor shaft of the stepping motor 430 by a coupling 432. The ball screw nut 433 is provided at a slider 434 fixed to the fine adjustment driver 44. The slider 434 is supported by a support 435 to slide in the z-axis direction. For example, a linear guide or a linear ball bearing is used as the support 435. The support 435 is provided on an inner surface of a body case 470.

When the threaded rod 431 is rotatably driven by the stepping motor 430, the slider 434 provided with the ball screw nut 433 is driven to move up and down in the z-axis direction along the threaded rod 431. An up-down drive stroke of the slider 434 as a coarse adjustment range is a movement amount from a lower end position when the valve body 40 is in a fully-closed state to an upper end position when the valve body 40 is in a fully-open state. A position sensor 436 is a sensor configured to detect that the slider 434 has reached the lower end position, and, e.g., a photo interrupter is used.

The fine adjustment driver 44 is a driver having a smaller up-down drive stroke than that of the coarse adjustment driver 43 and having a higher resolution than that of the coarse adjustment driver 43. For example, the fine adjustment driver 44 has an axial magnetic levitation actuator, and a housing 440 (440a, 440b, 440c) of the fine adjustment driver 44 is fixed to the slider 434. The housing 440 is, for example, in a cylindrical shape, and includes a bottom plate 440a, a side wall 440b, and a top plate 440c. The housing 440 includes a pair of electromagnets (an upper electromagnet 441a and a lower electromagnet 441b) and an axial disc 442 magnetically levitated and supported in the z-axis direction by the upper electromagnet 441a and the lower electromagnet 441b. Displacement of the axial disc 442 in the z-axis direction is detected by an axial gap sensor 444 provided facing a sensor target 443 provided on a lower surface of the axial disc 442.

A valve rod 450 is fastened to the axial disc 442. The valve rod 450 is supported by a linear ball bearing 451 provided at the body case 470 to move in the z-axis direction. As illustrated in FIG. 1, the valve rod 450 extends to a vacuum chamber 1 side through the valve seat 41, and the valve body 40 arranged in the vacuum chamber 1 is fixed to an upper end of the valve rod 450. Since the inside of housings of the valve body drivers 42A, 42B is in an atmospheric pressure state, a bellows 452 is provided between the valve rod 450 and the valve seat 41 such that no gas in the valve body driver 42A enters the vacuum chamber 1 through a clearance between a through-hole of the valve seat 41 and the valve rod 450. The bellows 452 functions as a vacuum seal configured to separate an internal space of the vacuum chamber 1 and an internal space of the body case 470.

As described above, the valve body driver 42A, 42B includes the coarse adjustment driver 43 and the fine adjustment driver 44, and drives the valve body 40 in the z-axis direction by the total La+Lb of a drive amount La by the coarse adjustment driver 43 and a drive amount Lb (<La) by the fine adjustment driver 44. For example, the drive amount La is indicated using, as a reference position, a valve body fully-closed position, and the drive amount Lb is indicated using, as a reference position, a neutral position (an intermediate position) of an electromagnetic actuator. The method for calculating these drive amounts La, Lb will be described in detail below.

The axial magnetic levitation actuator used for the fine adjustment driver 44 generally has a position accuracy (a minimum drivable amount) of equal to or less than 1 μm. On the other hand, the position accuracy of the coarse adjustment driver 43 using the stepping motor 430 and a ball screw mechanism depends on a resolution (a minimum drivable amount) determined by the step angle of the stepping motor 430 and a position displacement error due to backlash of the ball screw mechanism. Thus, the position accuracy of the coarse adjustment driver 43 is lower than that of the fine adjustment driver 44 having the axial magnetic levitation actuator.

In the present embodiment, coarse up-down drive by the coarse adjustment driver 43 and fine up-down drive by the fine adjustment driver 44 are combined to form a configuration in which the valve body 40 can be positioned with a high accuracy. In up-down drive by the stepping motor 430, the stepping motor 430 is rotatably driven with a preset resolution corresponding to a predetermined step angle. Thus, according to the step angle, the minimum displacement $\Delta La1$ of the slider 434, i.e., the minimum displacement $\Delta La1$ of the valve rod 450 by the coarse adjustment driver 43, is determined. The maximum value $\Delta La2$ of the displacement error due to backlash of the ball screw mechanism is given in advance, and therefore, the position accuracy of the coarse adjustment driver 43 is $\Delta La1+\Delta La2$. Thus, the axial magnetic levitation actuator of the fine adjustment driver 44 is configured so that displacement of the valve rod 450 can be finely adjusted by $\Delta La1+\Delta La2$.

For example, in a case where the stepping motor 430 is a two-phase motor, when the step angle is 1.8° and the lead pitch of the threaded rod 431 is 10 mm, the minimum displacement $\Delta La1$ is $\Delta La1=50$ μm $(=(1.8/360)\times 10000)$. In a case where it is assumed that the maximum value $\Delta La2$ of the displacement error due to backlash of the ball screw mechanism is 100 μm, $\Delta La1+\Delta La2=150$ μm is satisfied. Even a versatile axial magnetic bearing can adjust displacement within a range of about 500 μm, and therefore, position error correction by the fine adjustment driver 44 is possible for the displacement error $\Delta La1+\Delta La2$. That is, the fine adjustment driver 44 has the position accuracy (the resolution) for positioning the valve body 40 with a smaller movement amount than the movement amount (the resolution) indicating the position accuracy of the coarse adjustment driver 43.

In the poppet vacuum valve 4 configured such that the valve body 40 is driven to move up and down relative to the valve opening 410 to perform the opening/closing operation as illustrated in FIG. 1, a maximum of about 100 mm is, depending on the diameter of the valve body 40, necessary as the stroke of the valve body 40 from the fully-closed position at which a valve conductance is zero to a fully-open position at which a sufficient valve conductance is obtained. Thus, the coarse adjustment driver 43 is driven to move the valve body 40 up and down in a movable stroke range of 100 mm, i.e., the coarse adjustment range.

(Details of Valve Controller 5)

Figure 3:
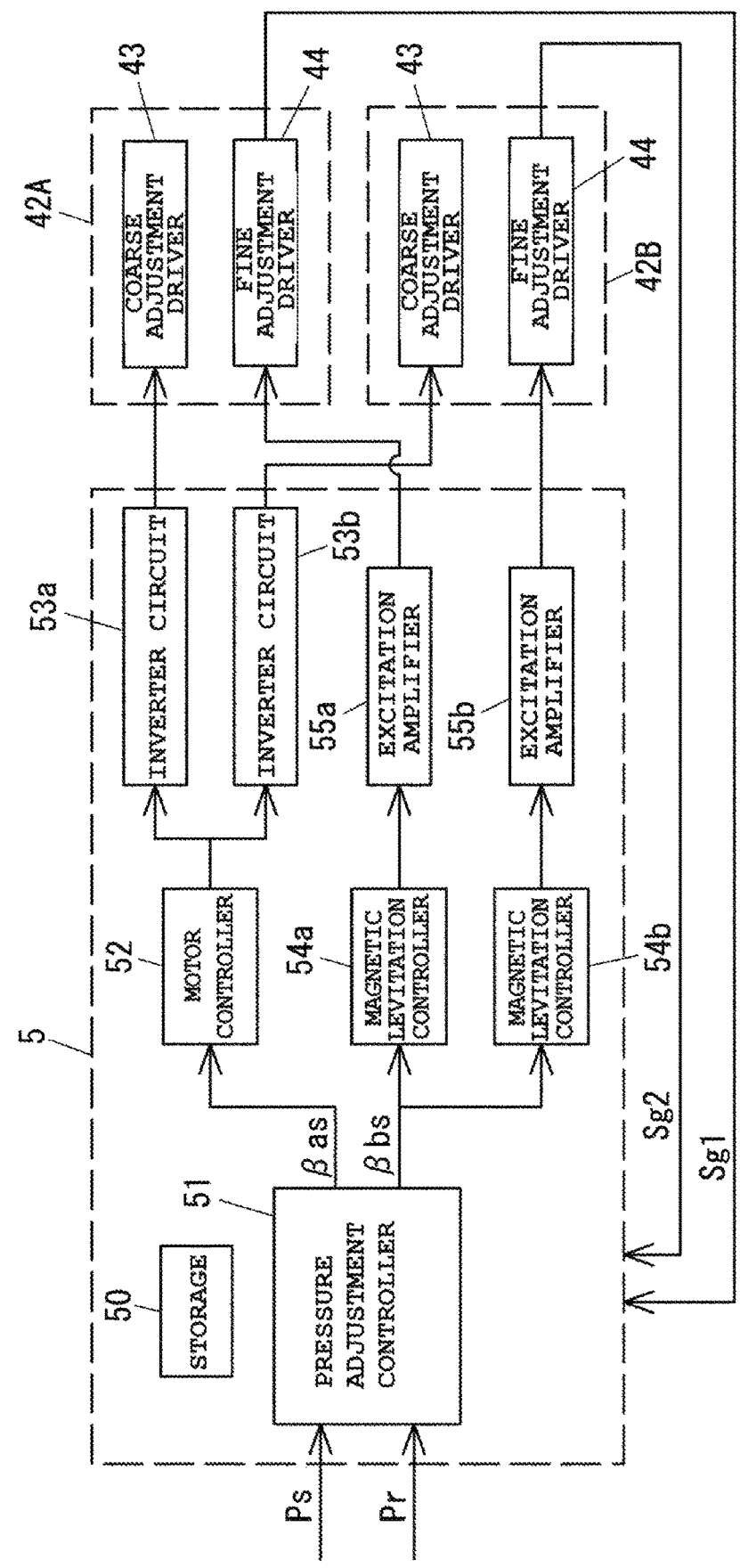
FIG. 3 is a block diagram of a configuration of a valve controller.

FIG. 3 is a block diagram of a configuration of the valve controller 5. The valve controller 5 is composed of for example a CPU, a memory (ROM, RAM) and a circuitry.

The valve controller 5 adjusts the opening degree of the vacuum valve 4, i.e., the valve conductance, based on the pressure measurement value Pr measured by the vacuum meter 11 such that the pressure of the vacuum chamber 1 reaches a given pressure target value Ps. The opening degree of the vacuum valve 4 is herein represented by $\alpha$ calculated by Expression (1) below.

$$\alpha=(L/L0)\times 100 \quad (1)$$

In Expression (1), L0 is a drive amount of the valve body 40 in the fully-open state with reference to a valve body position in the fully-closed state as a reference position, and corresponds to the movable stroke of the valve body 40. L in Expression (1) is a drive amount from the reference position to a current drive position, and will be hereinafter referred to as a "valve body drive amount." The above-described drive amount La by the coarse adjustment driver 43 is an amount represented by an integral multiple of the above-described minimum displacement $\Delta La1$, and a difference=L−La is adjusted by the drive amount Lb of the fine adjustment driver 44 to realize the valve body drive amount L. Moreover, the drive amount Lb of the fine adjustment driver 44 is a displacement amount from an intermediate position with reference to an intermediate position of the axial disc 442 between the upper electromagnet 441a and the lower electromagnet 441b. Thus, in a case where the position of the axial disc 442 is on a lower electromagnet 441b side with respect to the intermediate position, the drive amount Lb is a negative value. Expression (1) is an expression representing a correlation between the opening degree $\alpha$ and the valve body drive amount L, and description will be hereinafter made using the valve body drive amount L instead of the opening degree $\alpha$.

As illustrated in FIG. 3, the valve controller 5 includes a storage 50, a pressure adjustment controller 51, a motor controller 52, inverter circuits 53a, 53b, magnetic levitation controllers 54a, 54b, and excitation amplifiers 55a, 55b. The magnetic levitation controller 54a and the excitation amplifier 55a are provided corresponding to the valve body driver 42A, and the magnetic levitation controller 54b and the excitation amplifier 55b are provided corresponding to the valve body driver 42B. The pressure target value Ps and the pressure measurement value Pr measured by the vacuum meter 11 are input to the valve controller 5 from the device controller 2, and displacement signals Sg1, Sg2 detected by the axial gap sensors 444 are input to the valve controller 5 from the fine adjustment drivers 44.

In the storage 50, pumping characteristic data indicating a correlation between the valve body drive amount L and an effective pumping speed Se or a correlation between the valve body drive amount L and the conductance Cv of the vacuum valve 4 is stored. The effective pumping speed Se is the pumping speed of a vacuum pumping system including the vacuum pump 3 and the vacuum valve 4, and is calculated from the pumping speed Sp of the vacuum pump 3 and the conductance Cv of the vacuum valve 4. Alternatively, the effective pumping speed Se is obtained in such a manner that the pumping speed of the vacuum pumping system including the vacuum pump 3 and the vacuum valve 4 is actually measured. Hereinafter, a case where the pumping characteristic data indicating the correlation between the valve body drive amount L and the effective pumping speed Se is stored in the storage 50 will be described by way of example.

The pressure adjustment controller 51 calculates a difference $\Delta P=Ps-Pr$ between the pressure target value Ps and the pressure measurement value Pr, and performs pressure adjustment control by open loop control in the case of $|\Delta P|>\Delta Pth$ and performs the pressure adjustment control by a closed loop control in the case of $|\Delta P|\leq\Delta Pth$. The pressure adjustment controller 51 outputs target position commands βas, βbs corresponding to displacement to the motor controller 52 and the magnetic levitation controllers 54a, 54b. As described later, a target valve body drive amount Ls corresponding to the pressure target value Ps is calculated in the pressure adjustment controller 51, and the valve body 40 is driven by the valve body drivers 42A, 42B by a drive amount based on the difference ΔL=Ls−L between the target valve body drive amount Ls and a current valve body drive amount L. ΔL is herein referred to as a drive adjustment amount of the valve body driver 42A, 42B, and drive adjustment amounts of the coarse adjustment driver 43 and the fine adjustment driver 44 are each ΔLa, ΔLb. That is, ΔL=ΔLa+ΔLb is satisfied. Note that details of the pressure adjustment control will be described later.

The motor controller 52 inputs, to two inverter circuits 53a, 53b, a PWM gate signal generated based on the target position command βas input from the pressure adjustment controller 51. The coarse adjustment driver 43 provided at the valve body driver 42A of two valve body drivers 42A, 42B is driven by the inverter circuit 53a, and the coarse adjustment driver 43 provided at the valve body driver 42B is driven by the inverter circuit 53b. Each of the inverter circuits 53a, 53b drives the stepping motor 430 of each coarse adjustment driver 43 based on the PWM gate signal input from the pressure adjustment controller 51. As a result, in the valve body drivers 42A, 42B, the sliders 434 fixed to the fine adjustment drivers 44 are driven in the z-axis direction by the same drive amount.

(Details of Motor Controller 52)

Figure 4:
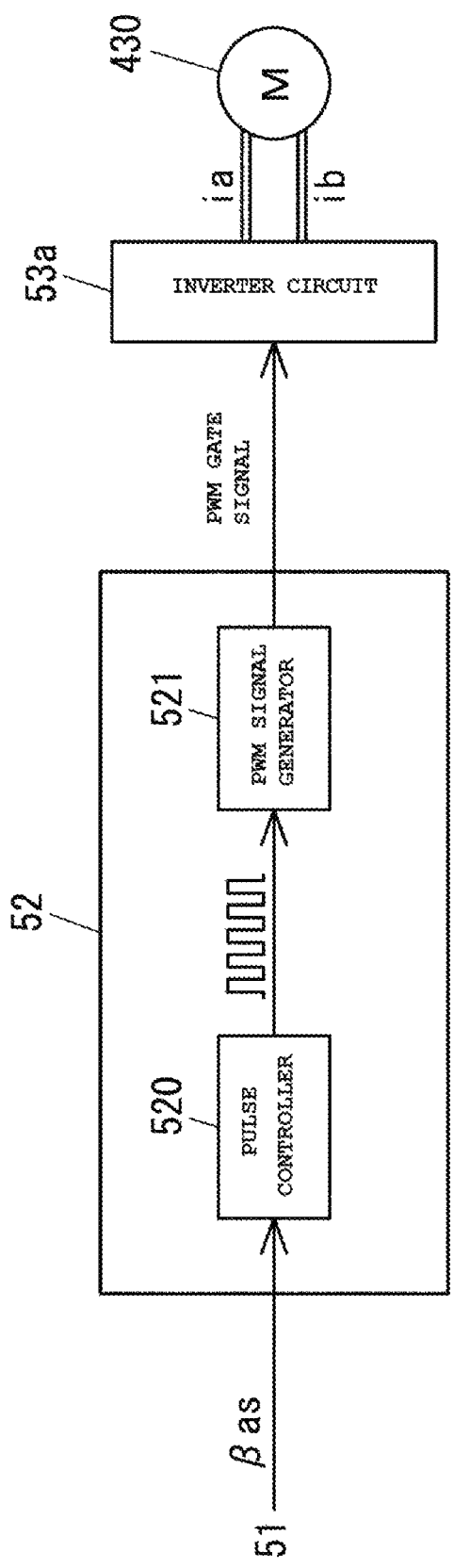
FIG. 4 is a view of more details of a motor controller of FIG. 3.

FIG. 4 is a block diagram of more details of the motor controller 52 relating to drive of the stepping motor 430. A pulse controller 520 and a PWM signal generator 521 are provided in the motor controller 52. The target position command βas input from the pressure adjustment controller 51 to the motor controller 52 is a command regarding a rotation direction, a drive angle, and a drive speed for drive by the above-described drive adjustment amount ΔLa. The pulse controller 520 generates a command pulse signal based on the target position command βas from the pressure adjustment controller 51. The drive adjustment amount ΔLa of the coarse adjustment driver 43 is determined by the pulse number of the command pulse signal, and the drive speed is determined by the frequency of the command pulse signal. The PWM signal generator 521 generates the PWM gate signal based on the command pulse signal. The inverter circuit 53a is driven by the PWM gate signal, and two-phase currents ia, ib are supplied to the stepping motor 430 (the two-phase motor).

(Control System of Fine Adjustment Driver 44)

Figure 5:
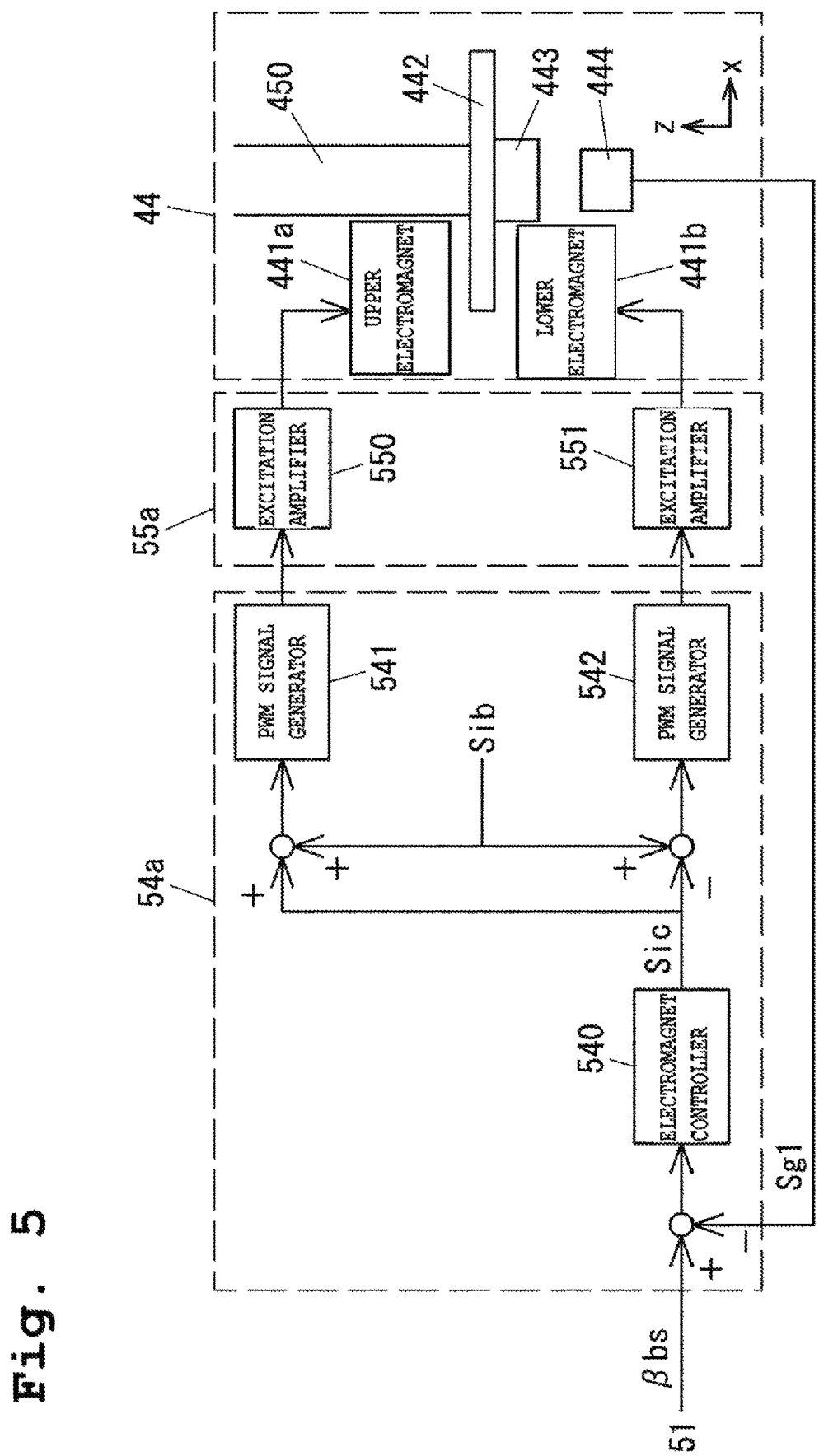
FIG. 5 is a block diagram regarding magnetic levitation control by a fine adjustment driver.

FIG. 5 is a block diagram regarding magnetic levitation control of the fine adjustment driver 44. The magnetic levitation controller 54a includes an electromagnet controller 540 and PWM signal generators 541, 542. The excitation amplifier 55a includes an excitation amplifier 550 configured to supply excitation current to the upper electromagnet 441a, and an excitation amplifier 551 configured to supply excitation current to the lower electromagnet 441b.

The target position command βbs input from the pressure adjustment controller 51 to the magnetic levitation controller 54a is a command for driving the valve body 40 by the fine adjustment driver 44 by the above-described drive adjustment amount ΔLb. A difference=βbs−Sg1 between the target position command βbs input from the pressure adjustment controller 51 and the displacement signal Sg1 input from the axial gap sensor 444 is input to the electromagnet controller 540. The target position command βbs and the displacement signal Sg1 are amounts corresponding to displacement, and the difference therebetween is also an amount corresponding to displacement. The electromagnet controller 540 generates a control current command Sic based on the difference=βbs−Sg1.

In the axial magnetic levitation actuator of the fine adjustment driver 44, a bias current (also referred to as an "offset current") ib and a control current is are, as excitation current, supplied to the upper electromagnet 441a and the lower electromagnet 441b arranged facing each other with respect to the axial disc 442. A signal Sib of FIG. 5 is a bias current command regarding the bias current ib, and the control current command Sic is a command regarding the control current ic. For example, the excitation current Ia of the upper electromagnet 441a is set as Ia=ib+ic, and the excitation current Ib of the lower electromagnet 441b is set as Ib=ib−ic.

The control current command Sic output from the electromagnet controller 540 is added to and subtracted from the bias current command Sib. The bias current command Sib is set such that a certain value of bias current ib is supplied. Sib+Sic as an excitation current command is input to the PWM signal generator 541, and the PWM signal generator 541 outputs the PWM gate signal based on the excitation current command (Sib+Sic) to the excitation amplifier 550 of the upper electromagnet 441a. The excitation amplifier 550 supplies excitation current based on the PWM gate signal from the PWM signal generator 541 to the upper electromagnet 441a. Meanwhile, Sib−Sic as an excitation current command is input to the PWM signal generator 542, and the PWM signal generator 542 outputs the PWM gate signal based on the excitation current command (Sib−Sic) to the excitation amplifier 551 of the lower electromagnet 441b. The excitation amplifier 551 supplies excitation current based on the PWM gate signal from the PWM signal generator 542 to the lower electromagnet 441b.

The bias current ib is set as a certain value, and the control current is increased/decreased according to the control current command Sic to change a levitation position of the axial disc 442 upward (a positive direction of a z-axis) or downward (a negative direction of the z-axis) as viewed in the figure. As a result, the valve rod 450 is driven up and down. Note that the electromagnet controller 540 normally includes a proportional-integral-derivative (PID) controller, and the weight of the valve body itself is supported by an integral element. For example, in a state in which the upper electromagnet 441a and the lower electromagnet 441b are electromagnets with the same specifications and the axial disc 442 is levitated and stopped at the intermediate position thereof, the weight of the valve body 40 itself acts downward, and therefore, such a weight is attracted and supported by the upper electromagnet 441a. In this case, the excitation currents Ia, Ib satisfy Ia>Ib, i.e., the excitation current is higher in the upper electromagnet 441a than in the lower electromagnet 441b, and inmost cases, a current value indicates direct current.

(Pressure Adjustment Control Processing Flow)

Figure 6:
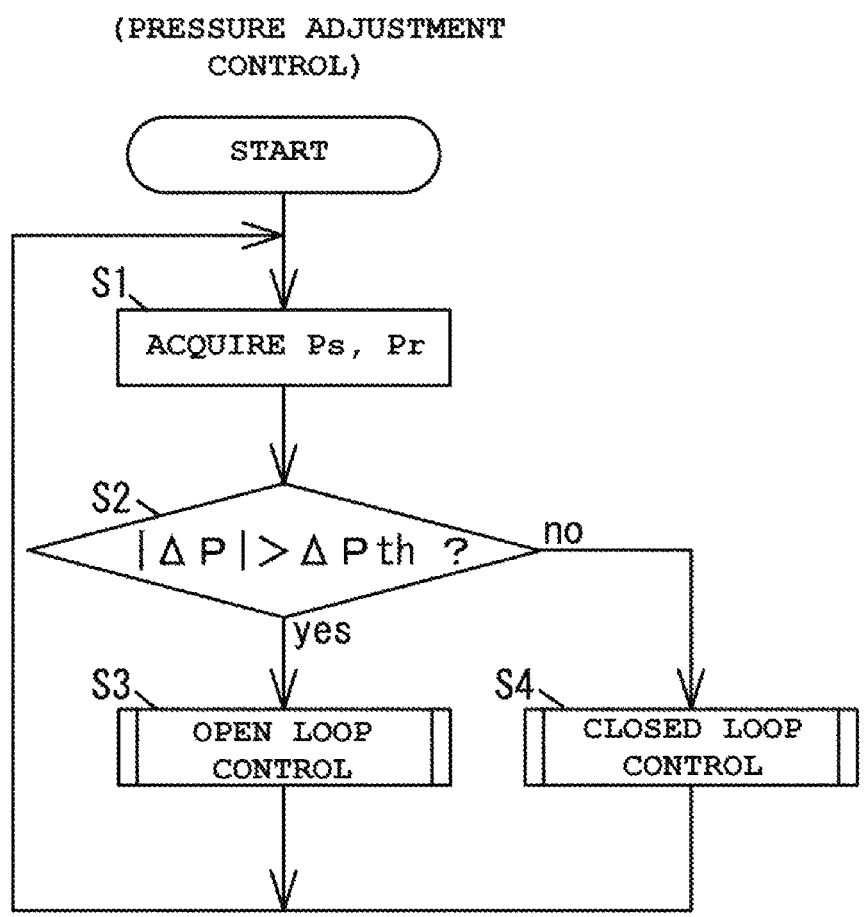
FIG. 6 is a flowchart of steps of the outline of pressure adjustment control.

Next, the pressure adjustment control by the pressure adjustment controller 51 will be described. FIG. 6 is a flowchart of steps of the outline of the pressure adjustment control. Note that pressure adjustment operation in a case where the pressure target value Ps is changed under a condition where the flow rate Qin of gas injected into the vacuum chamber 1 is constant will be described below by way of example. At a step S1, the pressure adjustment controller 51 acquires the pressure target value Ps and the pressure measurement value Pr from the device controller 2. At a step S2, it is determined whether or not an absolute value of the difference ΔP=Ps−Pr between the pressure target value Ps and the pressure measurement value Pr satisfies |ΔP|>ΔPth. ΔPth is a difference threshold for determining whether the control is the open loop control or the closed loop control.

When it is determined as |ΔP|>ΔPth at the step S2, the processing proceeds to a step S3, and valve body drive processing by the open loop control is executed. On the other hand, when it is determined as |ΔP|≤ΔPth at the step S2, the processing proceeds to a step S4, and the valve body drive processing by the closed loop control is executed. When the valve body drive processing is performed at the step S3 or the step S4, the processing proceeds to the step S1 to acquire the pressure target value Ps and the pressure measurement value Pr after the valve body drive processing from the device controller 2, and at the step S2, it is determined whether or not |ΔP|>ΔPth is satisfied. As described above, determination on whether or not |ΔP|>ΔPth is satisfied is made in every valve body drive, and based on such a determination result, the valve body drive by the open loop control or the closed loop control is performed.

(Open Loop Control)

Figure 7:
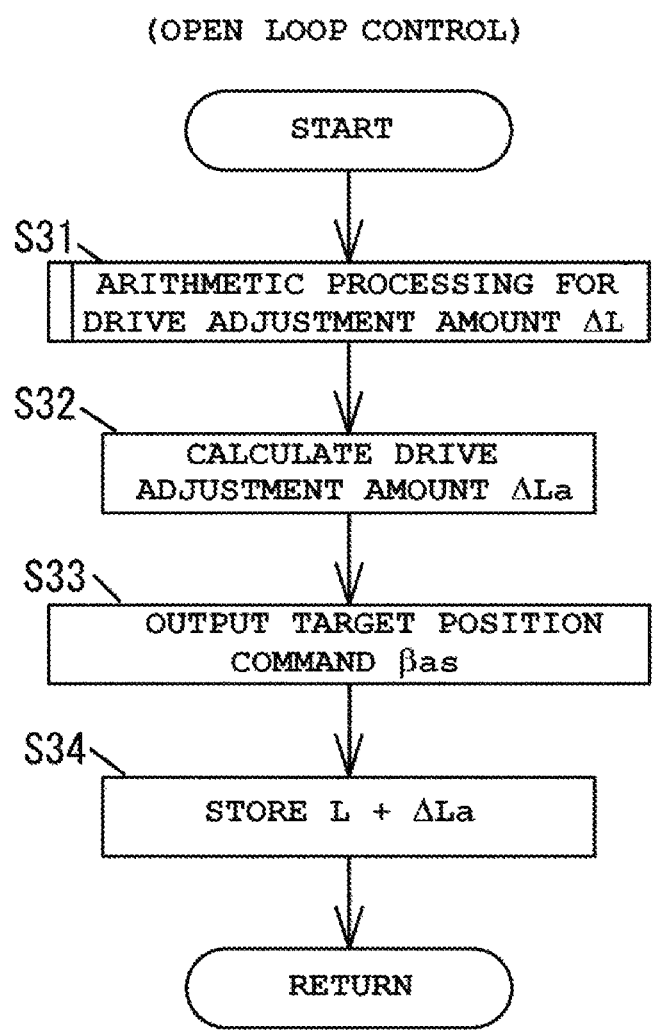
FIG. 7 is a flowchart of one example of open loop control processing.

FIG. 7 is a flowchart of one example of open loop control processing of the step S3 of FIG. 6. In the present embodiment, the valve body drive by the open loop control is performed using only the coarse adjustment driver 43. At a step S31, a series of arithmetic processing of obtaining the drive adjustment amount ΔL from the drive adjustment amounts of the valve body drivers 42A, 42B is executed.

Figure 8A:
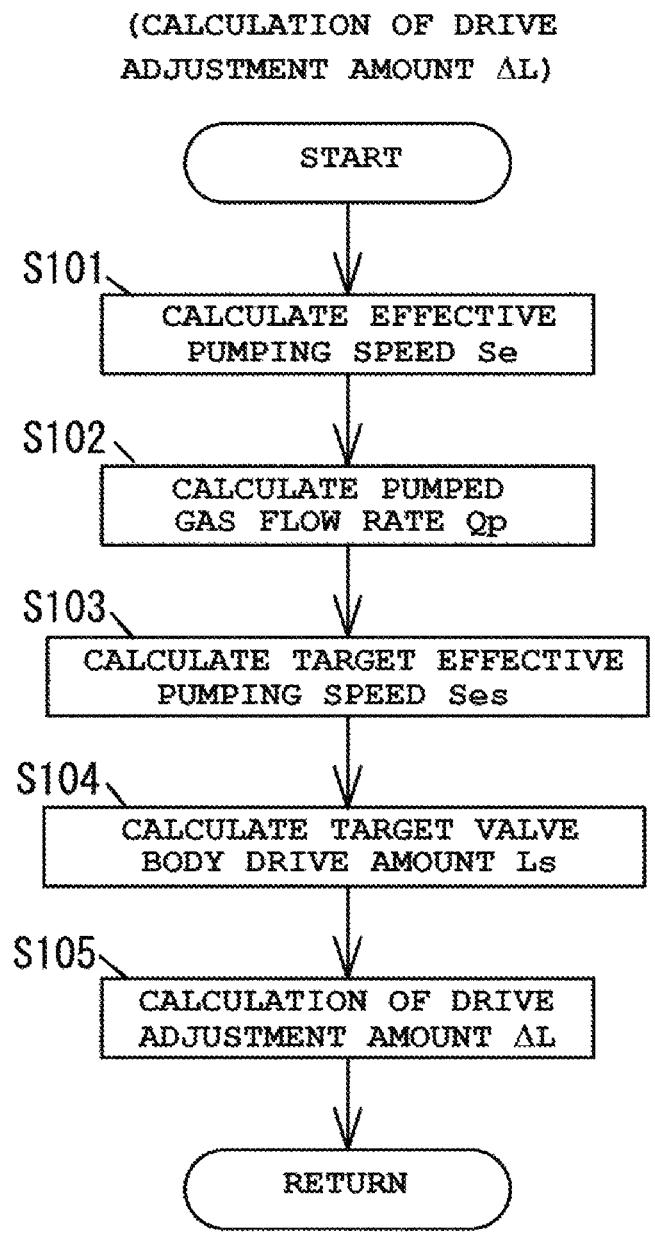
FIG. 8A is a flowchart of details of arithmetic processing for a drive adjustment amount ΔL.
Figure 8B:
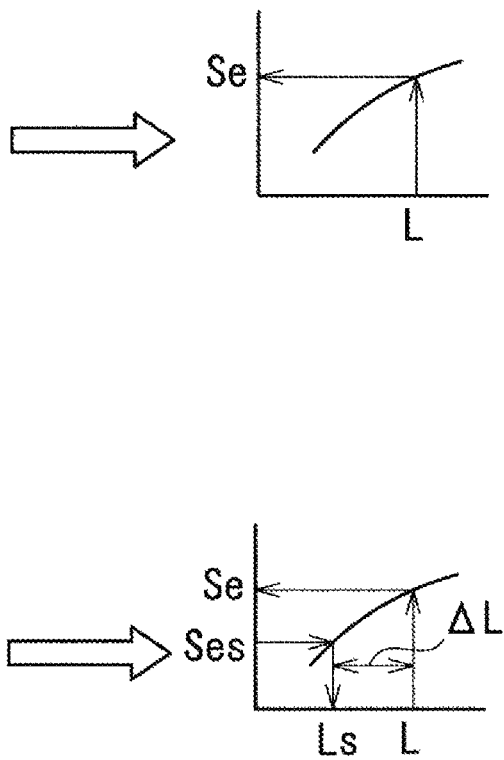
FIG. 8B is a graph for describing derivation of an effective pumping speed and a valve body drive amount from pumping characteristic data.

FIG. 8A is a flowchart of details of the arithmetic processing for the drive adjustment amount ΔL at the step S31 of FIG. 7. At a step S101, a current effective pumping speed Se is calculated from the current valve body drive amount L and the pumping characteristic data stored in the storage 50 (see FIG. 8B). As described above, the pumping characteristic data is data indicating the correlation between the valve body drive amount L and the effective pumping speed Se. At a step S102, a current pumped gas flow rate Qp=Se×Pr is calculated from the effective pumping speed Se calculated at the step S101 and the pressure measurement value Pr acquired at the step S1 of FIG. 6.

At a step S103, a target effective pumping speed Ses=Qp/Ps is calculated from the pumped gas flow rate Qp calculated at the step S102 and the pressure target value Ps acquired at the step S1 of FIG. 6. At a step S104, the target valve body drive amount Ls is calculated from the target effective pumping speed Ses calculated at the step S103 and the pumping characteristic data. At a step S105, the pressure adjustment controller 51 calculates the drive adjustment amount ΔL as a difference between the current valve body drive amount L and the target valve body drive amount Ls (see FIG. 8B).

Figure 9A:
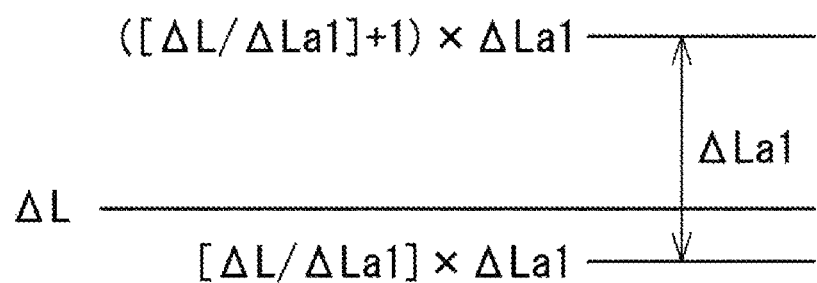
FIGS. 9A and 9B are graphs for describing a drive adjustment amount ΔLa.
Figure 9B:
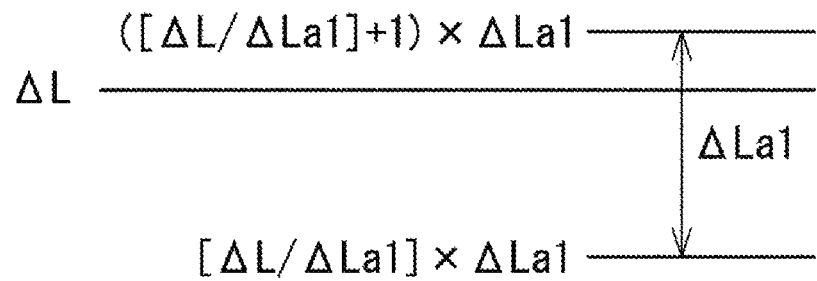

Returning to FIG. 7, the drive adjustment amount ΔLa of the coarse adjustment driver 43 is, at a step S32, calculated based on the drive adjustment amount ΔL calculated at the step S105 of FIG. 8. The coarse adjustment driver 43 can be only driven with the drive amount as the integral multiple of the minimum displacement ΔLa1 corresponding to a single step angle of the stepping motor 430. Thus, the drive adjustment amount ΔLa of the coarse adjustment driver 43 closest to the drive adjustment amount ΔL is represented by any of Expression (2) below or Expression (3) below. In Expressions (2) and (3), [ ] is a gauss sign. For example, as illustrated in FIG. 9A, in the case of ΔL−([ΔL/ΔLa1]×ΔLa1)≤ΔLa1/2, ΔLa of Expression (2) is used. As illustrated in FIG. 9B, in the case of ΔL−([ΔL/ΔLa1]×ΔLa1)>ΔLa1/2, ΔLa of Expression (3) is used.

$$\Delta La = [\Delta L/\Delta La1] \times \Delta La1 \quad (2)$$

$$\Delta La = ([\Delta L/\Delta La1]+1) \times \Delta La1 \quad (3)$$

At a step S33, the target position command βas based on the drive adjustment amount ΔLa calculated at the step S32, i.e., the command regarding the rotation direction, the drive angle, and the drive speed for drive by the drive adjustment amount ΔLa, is output to the motor controller 52 of FIG. 3. The motor controller 52 inputs the PWM gate signal based on the target position command βas to the inverter circuits 53a, 53b, thereby driving the coarse adjustment driver 43 of each of the valve body drivers 42A, 42B by the drive adjustment amount ΔLa. The current valve body drive amount after drive is L+ΔLa obtained by addition of the above-described drive adjustment amount ΔLa to the pre-drive valve body drive amount L stored in the storage 50. At a step S34, the valve body drive amount L+ΔLa is stored as a new current valve body drive amount L in the storage 50.

The drive processing by the open loop control ends upon completion of the processing of the step S34, and the processing proceeds to the step S1 of FIG. 6. Note that as described regarding the arithmetic processing for the drive adjustment amount ΔL in FIG. 8, the target valve body drive amount Ls is re-calculated based on a valve body drive amount L and a pressure measurement value Pr at the point of every coarse adjustment drive. In FIG. 6, after the processing has returned from the step S3 to the step S1, the open loop control of the step S3 is repeatedly executed until it is determined as |ΔP|≤ΔPth at the step S2. Then, when the value of the difference ΔP is decreased by the coarse adjustment drive and it is determined as |ΔP|≤ΔPth at the step S2, the processing proceeds to the step S4 to perform the valve body drive by the closed loop control.

(Closed Loop Control)

Figure 10:
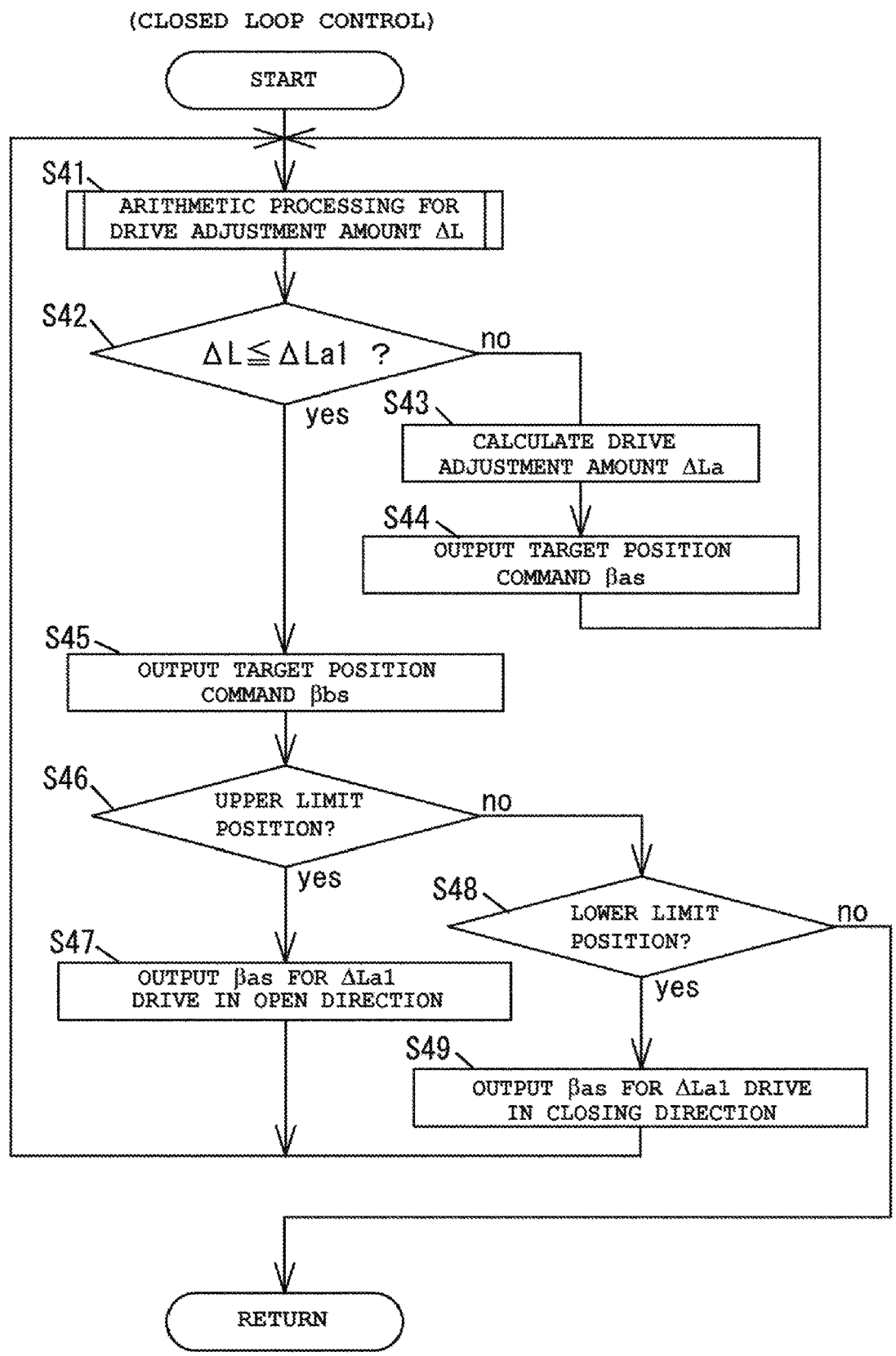
FIG. 10 is a flowchart of one example of closed loop control processing.

FIG. 10 is a flowchart of one example of closed loop control processing of the step S4 of FIG. 6. The valve body drive by the closed loop control is performed using a combination of the coarse adjustment driver 43 and the fine adjustment driver 44. At a step S41, the arithmetic processing for the drive adjustment amount ΔL as illustrated in FIG. 8 is executed. The steps of the arithmetic processing for the drive adjustment amount ΔL are similar to those in the case of the step S31 in the above-described case of the open loop control, and the drive adjustment amount ΔL as the difference between the current valve body drive amount L and the target valve body drive amount Ls is calculated.

At a step S42, it is determined whether or not the drive adjustment amount ΔL calculated at the step S41 is equal to or less than the minimum displacement ΔLa1 of the coarse adjustment driver 43. In a case where the drive adjustment amount ΔL is greater than the minimum displacement ΔLa1 of the coarse adjustment driver 43 (no), i.e., in the case of ΔL>ΔLa1, the fine adjustment drive is performed after the coarse adjustment drive has been performed. In the case of ΔL≤ΔLa1 (yes), the fine adjustment drive is promptly performed.

At the step S42, when it is determined as no (i.e., ΔL>ΔLa1), the processing proceeds to a step S43 to calculate the drive adjustment amount ΔLa by the coarse adjustment driver 43 according to Expression (2) or Expression (3) described above. At a step S44, the target position command βas based on the drive adjustment amount ΔLa calculated at the step S43, i.e., the command regarding the rotation direction, the drive angle, and the drive speed for drive by the drive adjustment amount $\Delta$La, is output to the motor controller 52 of FIG. 3. Accordingly, the coarse adjustment driver 43 of each of the valve body drivers 42A, 42B is driven by the drive adjustment amount $\Delta$La. When the processing of the step S44 ends, the processing returns to the step S41. As a result, the processing of the steps S41 to S44 is repeated until $\Delta L \leq \Delta La1$ is satisfied.

At the step S42, in a case where it is determined as $\Delta L \leq \Delta La1$ and the processing proceeds to a step S45, the pressure adjustment controller 51 outputs, as the target position command $\beta$bs, the drive adjustment amount $\Delta$Lb until the target valve body drive amount Ls, i.e., the drive amount from a current position L after the coarse adjustment drive to the target valve body drive amount Ls, to the magnetic levitation controllers 54a, 54b.

The magnetic levitation controller 54a provided at the valve body driver 42A controls a magnetic levitation position such that the difference=$\beta$bs−Sg1 between the target position command $\beta$bs input from the pressure adjustment controller 51 and the displacement signal Sg1 input from the axial gap sensor 444 reaches zero. Meanwhile, the magnetic levitation controller 54b provided at the valve body driver 42B controls the magnetic levitation position such that a difference=$\beta$bs−Sg2 between the target position command $\beta$bs and the displacement signal Sg2 input from the axial gap sensor 444 reaches zero. As described above, the magnetic levitation control by the valve body driver 42A and the magnetic levitation control by the valve body driver 42B are independently performed.

Adjustment of the magnetic levitation position by the fine adjustment driver 44 is limited to between a lower limit position on a lower electromagnet 441b side and an upper limit position on an upper electromagnet 441a side. According to the displacement signals Sg1, Sg2 from the axial gap sensors 444, the pressure adjustment controller 51 can recognize whether or not the magnetic levitation position has reached, during the fine adjustment drive, the upper limit position on the upper electromagnet 441a side or the lower limit position on the lower electromagnet 441b side.

At a step S46, the pressure adjustment controller 51 determines, based on the displacement signals Sg1, Sg2 from the axial gap sensors 444, whether or not the magnetic levitation position of at least one of the valve body drivers 42A, 42B has reached the upper limit position. On the other hand, in a case where the magnetic levitation position has reached the upper limit position, the processing proceeds to a step S47. In a case where it is, at the step S46, determined that the magnetic levitation position does not reach the upper limit position, the processing proceeds to a step S48, and it is determined whether or not the magnetic levitation position of at least one of the valve body drivers 42A, 42B has reached the lower limit position. In a case where it is, at the step S48, determined that the magnetic levitation position has reached the lower limit position, the processing proceeds to a step S49. In a case where it is determined that the magnetic levitation position does not reach the lower limit position, the drive processing by the closed loop control ends, and the processing returns to the step S1 of FIG. 6.

At the step S47, the pressure adjustment controller 51 outputs, to the motor controller 52, the target position command $\beta$as for performing the coarse adjustment drive of the valve body 40 in an open direction (i.e., the positive direction of the z-axis of FIG. 1) by the minimum displacement $\Delta$La1. At the step S49, the pressure adjustment controller 51 outputs, to the motor controller 52, the target position command $\beta$as for performing the coarse adjustment drive of the valve body 40 in a closing direction (i.e., the negative direction of the z-axis of FIG. 1) by the minimum displacement $\Delta$La1.

That is, when the drive control of the valve body 40 to an open side is performed, in a case where the electromagnetic actuator of the fine adjustment driver 44 reaches the upper limit position and can no longer move the valve body 40 to the target valve body drive amount Ls, the drive control of the valve body 40 to the open side is performed only by a single step by the coarse adjustment driver 43. Conversely, when the drive control of the valve body 40 to a closing side is performed, in a case where the electromagnetic actuator of the fine adjustment driver 44 reaches the lower limit position and can no longer move the valve body 40 to the target valve body drive amount Ls, the drive control of the valve body 40 to the closing side is performed only by a single step by the coarse adjustment driver 43.

Note that the coarse adjustment drive is performed only by a single step as the target position command $\beta$as for the minimum displacement $\Delta$La1, but the target position command $\beta$as may correspond multiple steps according to a magnetic levitation adjustment range (greater than the minimum displacement $\Delta$La1) of the fine adjustment driver 44.

When the processing of the step S47 or the step S49 ends, the processing proceeds to the step S41 to re-perform the arithmetic processing for the drive adjustment amount $\Delta$L and perform the processing after the step S42. As described above, the arithmetic processing for the drive adjustment amount $\Delta$L is performed every time the drive by the coarse adjustment driver 43 is performed, and based on such a result, drive adjustment by the fine adjustment driver 44 at the step S45 is performed. Thus, even in a case where a position error not depending on the minimum displacement (the minimum drivable amount) $\Delta$La1 of the coarse adjustment driver 43 is, as in backlash, caused due to the up-down drive by the coarse adjustment driver 43, such a position error can be eliminated by fine adjustment by the fine adjustment driver 44.

In the valve body drive control by the open loop control and the closed loop control as described above, the coarse adjustment drive is performed with the magnetic levitation position by the fine adjustment drive being maintained upon the coarse adjustment drive, but the control maybe made as follows. That is, when the drive by the coarse adjustment driver 43 is started, the magnetic levitation position of the fine adjustment driver 44 may be moved to a preset predetermined position (e.g., the neutral position), and the coarse adjustment drive may be performed with such a position being held. After the coarse adjustment drive has ended, the fine adjustment drive is performed from the predetermined position according to a pressure deviation $\Delta$P.

The case of independently driving coarse adjustment and fine adjustment has been described above, but when the coarse adjustment drive is performed, the fine adjustment drive may be activated simultaneously. In this case, in the fine adjustment drive, the target position command $\beta$bs is, without the drive adjustment amount $\Delta$Lb as a positional residue, directly output in such a direction that the pressure deviation $\Delta$P reaches zero. Moreover, the same also applies to coarse adjustment, and the target position command $\beta$as may be directly output in such a direction that the pressure deviation $\Delta$P reaches zero and the drive may be made based on the target position command $\beta$as.

(Fully-Closing Operation)

At the fully-closed position illustrated in FIG. 1, the seal member 411 attached to the valve seat 41 needs to be squashed with a predetermined displacement across the entire circumference of the seal member 411. In a case where pressing force necessary for squashing the seal member 411 to the predetermined displacement is 2×Fs+(the weight of the valve body 40 itself), pressing force Fs is generated by the fine adjustment driver 44 of each of the valve body drivers 42A, 42B. The excitation current Ia of the upper electromagnet 441a is, as one example, set to zero, and the excitation current Ib is supplied only to the lower electromagnet 441b. When a gap between the lower electromagnet 441b and the axial disc 442 is D, attraction force Fb of the lower electromagnet 441b is represented by Expression (4) below. An electromagnet parameter constant is represented by k. The gap D can be calculated based on a detection value of the axial gap sensor 444.

$$Fb=k(Ib/D)^2 \quad (4)$$

Figure 11:
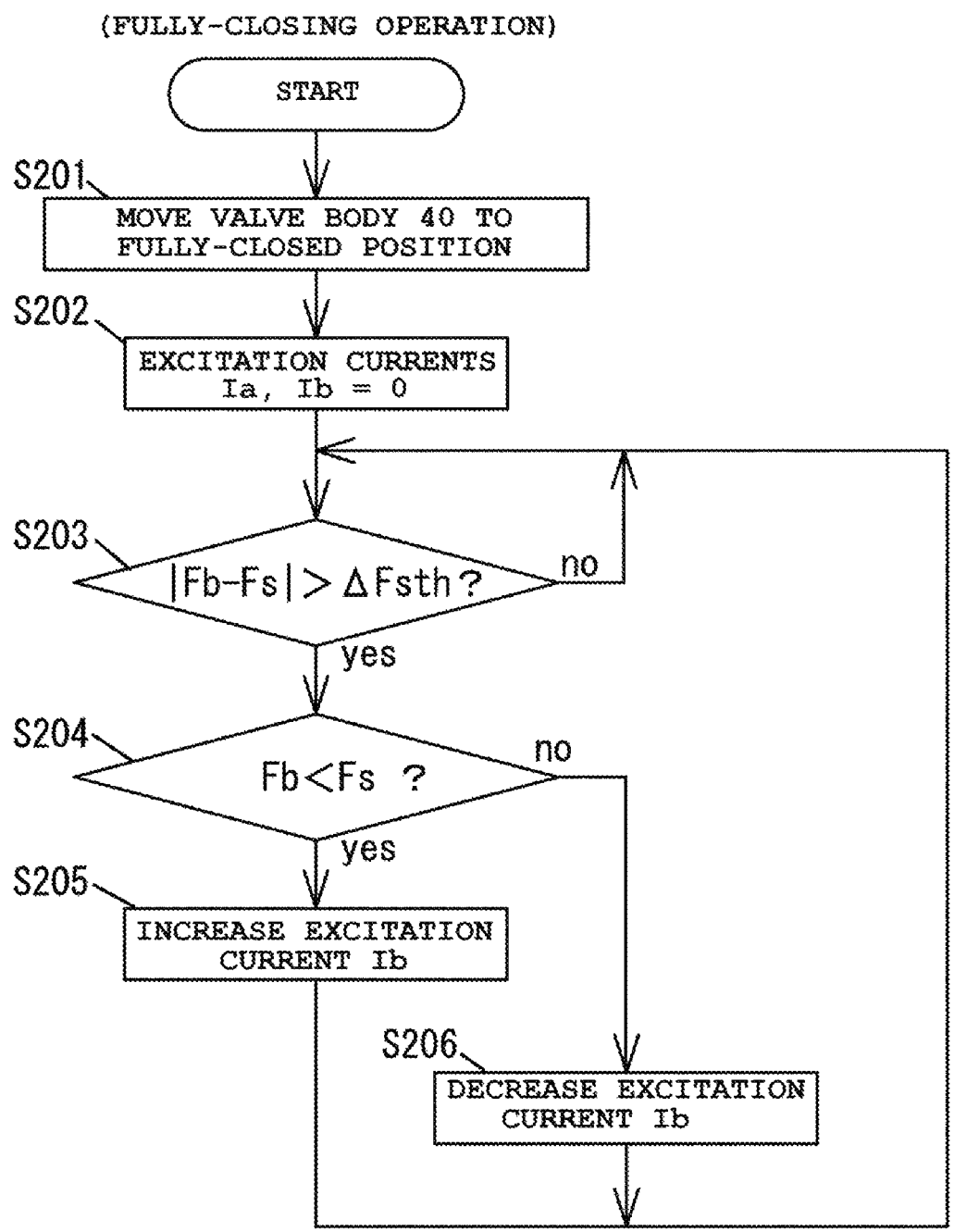
FIG. 11 is a flowchart of one example of fully-closing operation.

FIG. 11 is a flowchart of one example of fully-closing operation. At a step S201, the pressure adjustment controller 51 drives the valve body drivers 42A, 42B to drive the valve body 40 to the fully-closed position. For example, the fully-closed position is set to a position at which the valve body 40 contacts the seal member 411, and at the fully-closed position, the seal member 411 is compressed yet. Regarding the magnetic levitation position of the fine adjustment driver 44 at the fully-closed position, the axial disc 442 is arranged at the intermediate position between the upper electromagnet 441a and the lower electromagnet 441b, and a gap detected by the axial gap sensor 444 in this state is D0. That is, the target position command βbs for the fine adjustment driver 44 upon drive to the fully-closed position is a command for moving the axial disc 442 to the intermediate position.

At a step S202, the excitation currents Ia, Ib of the upper electromagnet 441a and the lower electromagnet 441b are brought to zero. As a result, the seal member 411 is deformed due to the weight of the valve body 40 itself, and the gap D0 changes to D1 (<D0). At a step S203, the downward attraction force Fb by the lower electromagnet 441b and the above-described pressing force Fs are compared with each other to determine whether or not an absolute value |Fs−Fb| of a difference=Fs−Fb is |Fs−Fb|>ΔFsth with respect to a determination threshold ΔFsth. That is, it is determined whether or not the pressing force on the seal member 411 exceeds an acceptable range with respect to the necessary predetermined pressure Fs.

When it is, at the step S203, determined as 51 Fs−Fb|>ΔFsth, i.e., it is determined that the pressing force for the seal member 411 is insufficient, the processing proceeds to a step S204. At the step S204, it is determined whether or not Fb<Fs is satisfied. In a case where it is, at the step S204, determined as Fb<Fs, the processing proceeds to a step S205 to change the excitation current Ib in an increasing direction to increase the attraction force of the lower electromagnet 441b, i.e., the force of compressing the seal member 411. Thereafter, the processing returns to the step S203. On the other hand, in a case where it is, at the step S204, determined as not Fb<Fs (no), i.e., the case of Fb>Fs, the processing proceeds to a step S206 to change the excitation current Ib in a decreasing direction to decrease the downward attraction force. Thereafter, the processing returns to the step S203.

The control illustrated in FIG. 11 is independently performed by the valve body drivers 42A, 42B, and the pressing force Fs is generated by each fine adjustment driver 44. As described above, the excitation current of the magnetic levitation actuator of the fine adjustment driver 44 of each of the valve body drivers 42A, 42B is adjusted so that the pressing force of the valve body 40 on the seal member 411 attached to the valve seat 41 can be adjusted to necessary pressing force "2×Fs+(the weight of the valve body 40 itself)." Thus, uniform pressing can be realized without inclination of the valve body 40 with respect to the seal member 411. Operation in a non-levitation control state has been described above, but pressing force necessary in a levitation control state may determined by application of DC components of the excitation currents Ia, Ib flowing in the upper electromagnet 441a and the lower electromagnet 441b.

(First Variation)

Figure 12:
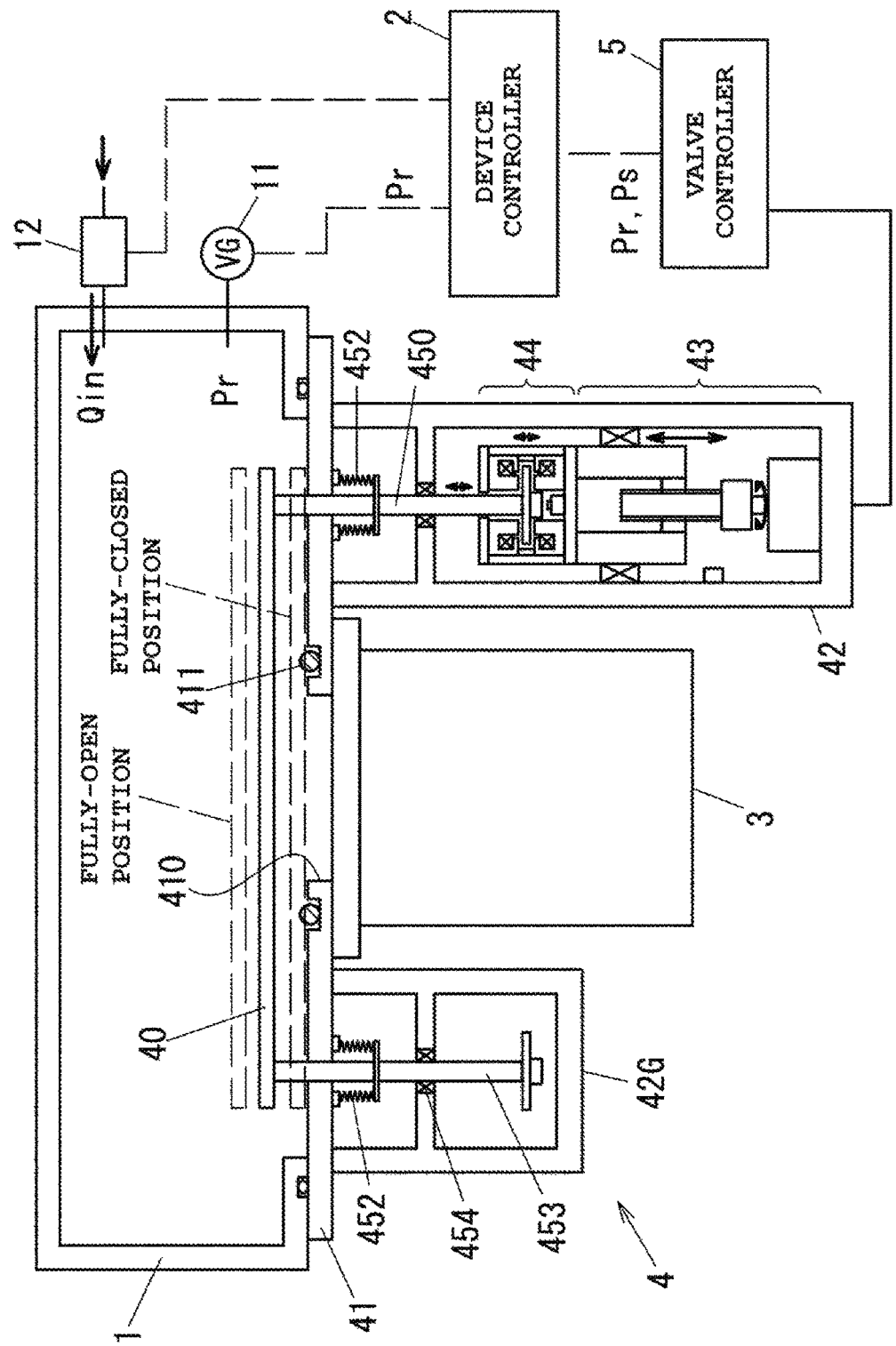
FIG. 12 is a view of an outline configuration of a vacuum valve of a first variation.

FIG. 12 is a view of a variation of the vacuum valve 4 illustrated in FIG. 1. In the vacuum valve 4 illustrated in FIG. 12, only one valve body driver 42 is provided. A portion corresponding to the valve body driver 42A of FIG. 1 is replaced with a guide 42G. A guide rod 453 fixed to the valve body 40 is provided at the guide 42G, and is supported by a linear ball bearing 454 to move in the z-axis direction. The bellows 452 is provided between the guide rod 453 and the valve seat 41. The valve body drivers 42 are reduced to one as described above so that a cost can be reduced.

Note that in the above-described embodiment, two valve body drivers 42A, 42B are used, but three or more valve body drivers may be used. Further, the coarse adjustment driver and the fine adjustment driver are provided in series at each of two valve body drivers or one valve body driver. However, two coarse adjustment drivers and two fine adjustment drivers may be separately arranged in parallel, for example.

(Second Variation)

For detecting step-out of the stepping motor 430, a rotary encoder may be added to the stepping motor 430. In a case where an encoder value (an actual rotation angle) is smaller than the step angle×a pulse count number, it is determined that the step-out has occurred, and the drive is additionally made for a deficiency of pulse number.

(Third Variation)

The valve body of the embodiment is provided in the vacuum chamber 1 as illustrated in FIG. 1. However, an auxiliary chamber (not shown) having a slightly-larger inner diameter than the outer diameter of the valve opening 410 may be provided on an outer surface of the vacuum chamber 1, and the valve body 40 may be provided facing the valve opening 410 in the auxiliary chamber.

(Fourth Variation)

The coarse adjustment driver 43 is of a ball screw type, but may be other direct-acting actuators. Moreover, the fine adjustment driver 44 is the electromagnetic actuator, but may be an actuator with a higher position accuracy (a higher resolution) than that of the coarse adjustment driver 43.

(1) According to the above-described embodiment and variations, the vacuum valve 4 is the vacuum valve configured to drive the valve body 40, which is arranged facing the valve opening 410, up and down relative to the valve opening 410 to perform the valve opening/closing operation, and includes the coarse adjustment driver 43 as a first up-down driver configured to drive the valve body 40 up and down with a first minimum drivable amount and the fine adjustment driver 44 as a second up-down driver configured to drive the valve body 40 up and down with a second minimum drivable amount smaller than the first minimum drivable amount. Thus, as compared to a vacuum valve including only a first up-down driver, the valve body 40 can be positioned with a higher accuracy, and a pressure adjustment accuracy in the vacuum process can be improved.

(2) Further, the magnetic levitation actuator configured to magnetically levitate and support the valve body 40 in an up-down drive direction is used as the second up-down driver so that positioning with a high accuracy of a µm order can be made. The position accuracy described herein also indicates that the position accuracy increases as a movement amount resolution increases.

(3) The valve controller 5 has a function as a valve control device configured to control the vacuum valve 4. The valve controller 5 includes the pressure adjustment controller 51 and the motor controller 52 as a first controller configured to control the up-down drive by the coarse adjustment driver 43 by the open loop control based on the pressure target value Ps and the pressure measurement value Pr of the vacuum chamber 1 subjected to vacuum-pumping through the vacuum valve 4, and the pressure adjustment controller 51 and the magnetic levitation controllers 54a, 54b as a second controller configured to control the up-down drive by the fine adjustment driver 44 or the up-down control by the coarse adjustment driver 43 and the fine adjustment driver 44 by the closed loop control based on the pressure target value Ps and the pressure measurement value Pr of the vacuum chamber 1. Note that the function as the valve control device may be carried by the device controller 2 instead of the valve controller 5, or may be independently provided as a device other than the valve controller 5 and the device controller 2.

(4) Further, the pressure adjustment controller 51 calculates the drive adjustment amount ΔLb by the fine adjustment driver 44 based on the pressure target value Ps and the pressure measurement value Pr after the up-down drive by the coarse adjustment driver 43, and also controls the up-down drive by the fine adjustment driver 44. Thus, even in a case where the position error not depending on the minimum displacement (the minimum drivable amount) ΔLa1 of the coarse adjustment driver 43 is, as in backlash, caused due to the up-down drive by the coarse adjustment driver 43, such a position error can be eliminated by fine adjustment by the fine adjustment driver 44.

(5) The valve control device configured to control the vacuum valve configured such that the magnetic levitation actuator configured to magnetically levitate and support the valve body 40 in the up-down drive direction is used as the second up-down driver includes the pressure adjustment controller 51 and the magnetic levitation controllers 54a, 54b as the second controller configured to control the up-down drive by the fine adjustment driver 44 by the closed loop control based on the pressure target value Ps and the pressure measurement value Pr. The second controller drives, when the vacuum valve 4 is fully closed, the valve body 40 in the direction of the valve seat 41 by the magnetic levitation actuator, and with the predetermined force, presses the valve body 40 against the seal member 411 provided between the valve body 40 and the valve seat 41. With this configuration, the pressing force for the seal member 411 is managed to the predetermined pressing force, and therefore, the fully-closed state of the valve body 40 can be realized with a high reliability.

Various embodiments and variations have been described above, but the present invention is not limited to the contents of these embodiments and variations. Other aspects conceivable within the scope of the technical idea of the present invention are also included in the scope of the present invention. For example, in the examples illustrated in FIGS. 1 and 12, the number of valve body drivers is one or two. However, three or more valve body drivers may be provided.

What is claimed is:

1. A vacuum valve for driving a valve body arranged facing a valve opening up and down relative to the valve opening to perform valve opening/closing operation, comprising:
    a first up-down driver configured to drive the valve body up and down with a first minimum drivable amount;
    a second up-down driver configured to drive the valve body up and down with a second minimum drivable amount smaller than the first minimum drivable amount, the second up-down driver being a magnetic levitation actuator configured to magnetically levitate and support the valve body in an up-down drive direction; and
    a valve control device, including:
        a first controller configured to control up-down drive by the first up-down driver by open loop control based on a pressure target value and a pressure measurement value of a chamber subjected to vacuum-pumping through the vacuum valve; and
        a second controller configured to control up-down drive of the second up-down driver by closed loop control or up-down drive of the first and second up-down drivers by closed loop control, based on the pressure target value and the pressure measurement value of the chamber subjected to vacuum-pumping through the vacuum valve.

2. The vacuum valve control device according to claim 1, wherein the second controller controls the up-down drive by the second up-down driver based on the pressure target value and the pressure measurement value after the up-down drive by the first up-down driver.

3. A vacuum valve for driving a valve body arranged facing a valve opening up and down relative to the valve opening to perform valve opening/closing operation, comprising:
    a first up-down driver configured to drive the valve body up and down with a first minimum drivable amount;
    a second up-down driver configured to drive the valve body up and down with a second minimum drivable amount smaller than the first minimum drivable amount, the second up-down driver being a magnetic levitation actuator configured to magnetically levitate and support the valve body in an up-down drive direction; and
    a valve control device, including:
        a first controller configured to control up-down drive by the first up-down driver by open loop control based on a pressure target value and a pressure measurement value of a chamber subjected to vacuum-pumping through the vacuum valve; and
        a second controller configured to control up-down drive by the second up-down driver by closed loop control based on the pressure target value and the pressure measurement value of the chamber subjected to vacuum-pumping through the vacuum valve,
        wherein the second controller drives, when the vacuum valve is fully closed, the valve body in a direction of a valve seat by the magnetic levitation actuator, and with predetermined force, presses the valve body against a seal member provided between the valve body and the valve seat.

4. The vacuum valve according to claim 1, wherein the first up-down driver is a linear actuator using a ball screw to be driven by a stepping motor.

5. The vacuum valve according to claim 4, wherein the linear actuator includes:

a ball screw nut provided at a slider fixed to the second up-down driver, a coupling, a threaded rod screwed into the ball screw nut, threaded rod being joined to a rotor shaft of the stepping motor by the coupling, and the slider supported by a support to slide in a z-axis direction.

6. The vacuum valve according to claim 1, wherein the magnetic levitation actuator includes:

an upper electromagnet, a lower electromagnet and an axial disc magnetically levitated and supported in a z-axis direction by the upper electromagnet and the lower electromagnet.

7. A vacuum valve for driving a valve body arranged facing a valve opening up and down relative to the valve opening to perform valve opening/closing operation, comprising:

a first up-down driver configured to drive the valve body up and down with a first minimum drivable amount; and a second up-down driver configured to drive the valve body up and down with a second minimum drivable amount smaller than the first minimum drivable amount, the second up-down driver being a magnetic levitation actuator configured to magnetically levitate and support the valve body in an up-down drive direction, wherein the magnetic levitation actuator includes:

an upper electromagnet, a lower electromagnet and an axial disc magnetically levitated and supported in a z-axis direction by the upper electromagnet and the lower electromagnet;

a sensor target provided on the lower surface of the axial disc; and an axial gap sensor provided facing the sensor target, and detecting displacement of the axial disc in the z-axis direction.

8. The vacuum valve according to claim 6, further comprising:

a linear ball bearing provided at a body case and, a valve rod fastened to the axial disc, and supported by the linear ball bearing to move in the z-axis direction, wherein the valve rod extends to a vacuum chamber side through a valve seat, and the valve body arranged in the vacuum chamber is fixed to an upper end of the valve rod.

9. The vacuum valve according to claim 8, wherein:

a bellows is provided between the valve rod and the valve seat such that no gas enters the vacuum chamber through a clearance between a through-hole of the valve seat and the valve rod.

10. A vacuum valve for driving a valve body arranged facing a valve opening up and down relative to the valve opening to perform valve opening/closing operation, comprising:

a first up-down driver configured to drive the valve body up and down with a first minimum drivable amount; and a second up-down driver configured to drive the valve body up and down with a second minimum drivable amount smaller than the first minimum drivable amount, the second up-down driver being a magnetic levitation actuator configured to magnetically levitate and support the valve body in an up-down drive direction;

wherein the first up-down driver is a linear actuator using a ball screw to be driven by a stepping motor, a position accuracy of the linear actuator is $\Delta La1 + \Delta La2$, $\Delta La1$ being a minimum displacement of a valve rod according to a step angle of the stepping motor, $\Delta La2$ being a maximum value of a displacement error due to backlash of the stepping motor, and the magnetic levitation actuator is configured so that displacement of a valve rod can be adjusted by $\Delta La1 + \Delta La2$.

11. The vacuum valve according to claim 1, wherein:

the second up-down driver has a position accuracy for positioning the valve body with a smaller movement amount than a movement amount indicating a position accuracy of the first up-down driver.

* * * * *